United States Patent
Suzuki et al.

(10) Patent No.: US 6,599,646 B2
(45) Date of Patent: Jul. 29, 2003

(54) MAGNETIC RECORDING MEDIUM

(75) Inventors: Toshio Suzuki, Akita (JP); Naoki Honda, Akita (JP); Kazuhiro Ouchi, Akita-ken (JP)

(73) Assignee: Governor of Akita Prefecture, Akita (JP)

( * ) Notice: Subject to any disclaimer, the term of this patent is extended or adjusted under 35 U.S.C. 154(b) by 0 days.

(21) Appl. No.: 09/952,786

(22) Filed: Sep. 13, 2001

(65) Prior Publication Data

US 2002/0041980 A1 Apr. 11, 2002

(30) Foreign Application Priority Data

Oct. 11, 2000 (JP) ........................... 2000-311019

(51) Int. Cl.$^7$ .............................. G11B 5/66; G11B 5/70
(52) U.S. Cl. ........................... 428/694 T; 428/694 TM; 428/694 TS; 428/900
(58) Field of Search ....................... 428/694 T, 694 TS, 428/694 TM, 900

(56) References Cited

U.S. PATENT DOCUMENTS

| | | | |
|---|---|---|---|
| 6,068,739 A | 5/2000 | Suzuki et al. ............. | 204/192.2 |
| 2001/0036562 A1 * | 11/2001 | Sellmyer et al. ......... | 428/694 T |
| 2001/0036564 A1 * | 11/2001 | Ohmori ................ | 428/694 TS |

FOREIGN PATENT DOCUMENTS

| | | | |
|---|---|---|---|
| JP | 11-276414 | | 9/1999 |
| JP | 3010156 | | 12/1999 |
| JP | 11-353648 A | * | 12/1999 |
| JP | 2001-101645 A | * | 4/2001 |

OTHER PUBLICATIONS

C. Chen et al., "Large Coercivity and Granular Structure of CoPt/SiO2 Films," IEEE Transactions on Magnetics, vol. 35, No. 5, Sep. 1999, pp. 3466–3468.

K. Coffey et al., "High Anisotropy L1o Thin Films for Longitudinal Recording," IEEE Transactions on Magnetics, vol. 31, No. 6, Nov. 1995, pp. 2737–2739.

S.–I. Iwasaki et al., "An Analysis for the Magnetization Mode for High Density Magnetic Recording," IEEE Transactions on Magnetics, vol. MAG–13, No. 5, Sep. 1977, pp. 1272–1277.

N. Li et al., "Magnetic Recording on FePt and FePtB Intermetallic Compound Media," IEEE Transactions on Magnetics, vol. 35, No. 2, Mar. 1999, pp. 1077–1081.

T. Shimatsu, "Activation Volume of FePt–TaN Nanocrystalline Thin Films with High Coercivity," Journal of the Magnetics Society of Japan, vol. 21, Supplement, No. S2, 1997, pp. 313–316.

S. Stavroyiannis et al., "CoPt/Ag nanocomposites for high density recording media," Applied Physics Letters, vol. 73, No. 23, Dec. 1998, pp. 3453–3455.

M. Watanabe, "Microstructure and magnetic properties of FePt–Al–O granular thin films," Applied Physics Letters, vol. 76, No. 26, Jun. 2000, pp. 3971–3973.

M. Yu et al., "Nanocomposite CoPt:C films for extremely high–density recording," Applied Physics Letters vol. 75, No. 25, Dec. 1999, pp. 3992–3994.

\* cited by examiner

*Primary Examiner*—Holly Rickman
(74) *Attorney, Agent, or Firm*—Christensen, O'Connor, Johnson, Kindness, PLLC (57) ABSTRACT

An information recording layer consisting of a composite of an ordered alloy of $L1_0$ crystal structure selected from a group A, and MgO is used for a perpendicular magnetic recording medium. The group A includes an FePt ordered alloy, a CoPt ordered alloy, an FePd ordered alloy and an alloy thereof. This information recording layer has a very small magnetic domain structure and allows high density recording as seen from a signal output spectrum showing a result of a recording and reproducing evaluation of a magnetic recording medium in one example. The information recording layer can be formed at lower film formation temperature than a temperature of a composite thin film of an ordered alloy of $L1_0$ crystal structure according to a conventional technique.

5 Claims, 9 Drawing Sheets

Composite thin film information recording layer consisting of ordered alloy of $L1_0$ crystal structure and MgO — 10

| Composite thin film information recording layer consisting of ordered alloy of $L1_0$ crystal structure and MgO | ~10 |

FIG. 1A

| Composite thin film information recording layer consisting of ordered phase of $L1_0$ crystal structure whose crystal lattice face (001) is oriented, and MgO | ~10' |

FIG. 1B

| Composite thin film information recording layer consisting of ordered phase of $L1_0$ crystal structure whose crystal lattice face (001) is oriented, and MgO | ~10' |
| Layer consisting of nonmagnetic material | ~20 |
| Layer consisting of soft-magnetic material | ~30 |

FIG. 1C

| Composite thin film information recording layer consisting of ordered phase of $L1_0$ crystal structure whose crystal lattice face (001) is oriented, and MgO | ~10' |
| Layer consisting of nonmagnetic material | ~20 |
| Layer consisting of soft-magnetic material | ~30 |
| Underlayer whose crystal lattice face (100) is oriented | ~40 |

MAGNETIC RECORDING MEDIUM

CROSS-REFERENCE TO RELATED APPLICATIONS

This application is based upon and claims the benefit of priority from the prior Japanese Patent Application No. 2000-311019, filed Oct. 11, 2000, the entire contents of which are incorporated herein by reference.

BACKGROUND OF THE INVENTION

The present invention relates to an information recording technique and particularly relates to a high density magnetic recording medium consisting of a novel information recording layer having a very small magnetic domain structure and realizing high recording resolution.

In recent years, the research and development of means for recording an enormous quantity of information have been actively underway. Among these means, the a real recording density of a magnetic recording medium employed for a computer hard disk apparatus has become higher with great strides.

At present, a recording system, which is referred to as "longitudinal magnetic recording", for recording signals with a magnetization vector oriented toward the in-plane direction of a recording film has been employed as a magnetic recording medium technique for a recording medium of this type. Further, attention is being paid to "Perpendicular Magnetic Recording" (S. Iwasaki and Y. Nakamura; IEEE Trans. Magn., vol. MAG-13, pp. 1272–1277, 1977) for recording signals with a magnetization vector oriented toward the perpendicular direction of a recording film, as a method for realizing higher density recording.

Meanwhile, Co—Cr-based alloys have been mainly used as magnetic recording materials for recording layers according to any recording systems. The crystal orientation of a Co—Cr-based alloy provided right on an underlayer can be controlled according to the material, crystal orientation or lattice constant of the underlayer. It is, therefore, possible to control the direction of an easy axis of magnetization determining the direction of a magnetization vector. Currently, the research and development of longitudinal recording media and perpendicular recording media each using a Co—Cr-base alloy thin film made by the above method as an information recording layer is actively underway.

Figure 12A:
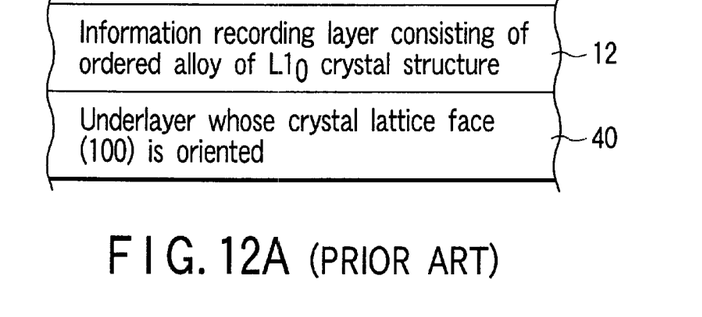
FIGS. 12A through 12C are basic layer structure views of a conventional magnetic recording medium.

By contrast to the information recording medium using the Co—Cr-based alloy thin film stated above, Japanese Patent No. 3010156 teaches the structure of a perpendicular magnetic recording medium using a thin film of ordered alloy with $L1_0$ crystal structure having excellent thermal stability and high magnetocrystalline anisotropy, as shown in FIG. 12A, as well as a manufacturing method therefor. The perpendicular magnetic recording medium manufactured according to this manufacturing method is an information recording medium wherein an underlayer 40 mainly consisting of an element selected from Cr, Pt, Pd, Au, Fe, Ni, MgO and NiO and a compound thereof is employed and a thin film of ordered alloy with $L1_0$ crystal structure is used as an information recording layer 12 (the medium having the structure shown in FIG. 12A will be referred to as "single-layer perpendicular magnetic recording medium" hereinafter).

Figure 12B:
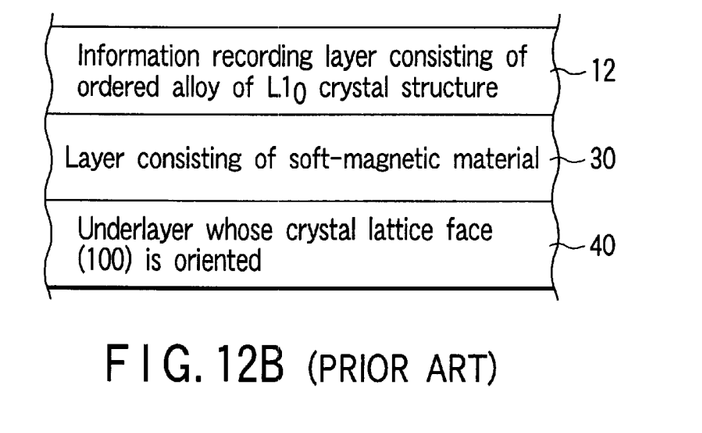

Further, the perpendicular magnetic recording medium is an information recording medium wherein a layer 30 (FIG. 12B) consisting of a soft-magnetic material such as Fe, FeSi alloy or Permalloy is provided and a thin film of ordered alloy with $L1_0$ crystal structure is used as the information recording layer 12 (the medium having the structure shown in FIG. 12B will be referred to as "double-layered perpendicular magnetic recording medium" hereinafter).

Figure 12C:
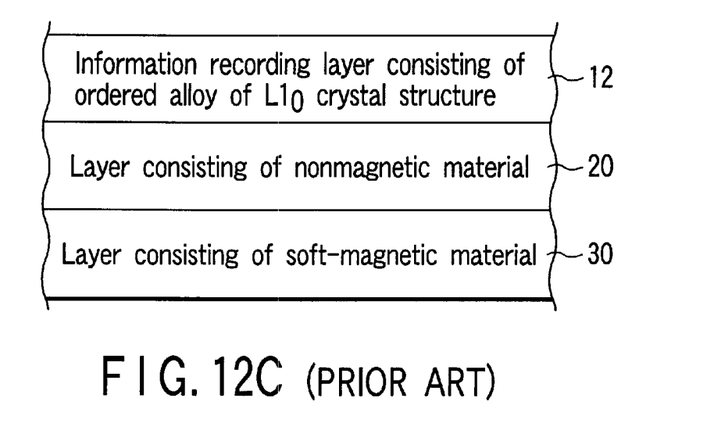

Also, Japanese Patent Application No. 11-276414 proposes the structure of a perpendicular magnetic recording medium employing a thin film of ordered alloy with $L1_0$ crystal structure realizing high signal output and high recording resolution and having high magnetocrystalline anisotropy as shown in FIG. 12C and a manufacturing method therefor.

In case of the perpendicular magnetic recording medium using a thin film of ordered alloy with $L1_0$ crystal structure as stated above, however, it is not easy to control the magnetic characteristics of the thin film of ordered alloy with $L1_0$ crystal structure or, to be specific, the coercivity, saturation magnetization and magnetic domain size of the thin film. To improve the recording resolution of the recording medium and reduce medium noise for improving a signal to noise ratio, in particular, a technique for controlling the microstructure of the thin film of ordered alloy with $L1_0$ crystal structure and for reducing magnetic domain size is required.

Meanwhile, K. R. Coffer, M. A. Parker and J. K. Howard (IEEE Trans. Mag., vol. 31, pp. 2737–2739 (1995)) proposes a method for manufacturing a thin film of a composite obtained by adding $ZrO_X$ to a thin film of ordered alloy with $L1_0$ crystal structure and for controlling the microstructure of the thin film of ordered alloy with $L1_0$ crystal structure. With the technique proposed therein, the crystal orientation of an ordered phase with $L1_0$ crystal structure is not controlled, with the result that an obtained perpendicular magnetic component is small, making it difficult to use the perpendicular magnetic component for the perpendicular magnetic recording system suited for high density recording. Further, since annealing is performed after forming the composite thin film so as to form an ordered phase with $L1_0$ crystal structure exhibiting high magnetocrystalline anisotropy, this method requires a complicated medium manufacturing step.

As additives used for a composite thin film consisting of ordered alloy with $L1_0$ crystal structure, TaN (e.g., T. Shimatsu, E. G. Keim, T. Bolhuis, and J. C. Lodder; J. Magn. Soc. Jpn., S2-21, pp. 313–316 (1997)), Ag (e.g., S. Stavroyiannis, I. Panagiotopoulous, D. Niarchos, J. A. Christodoulides, Y. Zhang, and G. C. Hadjipanayis; Appl. Phys. Lett., 73, pp. 3453–3455 (1988)), C (e.g., M. Yu, Y. Liu, A. Moser, D. Weller, and D. J. Sellmyer; Appl. Phys. Lett., 75, pp. 3992–3994 (1999)), B (e.g., N. Li, and B. M. Lairson; IEEE Tran. Magn. vol. 35, pp. 1077–1081 (1999)), $SiO_2$ (e.g., C. Chen, O. Kitakami, S. Okamoto, Y. Shimada, K. Shibata, and M. Tanaka; IEEE Trans. Magn., vol. 35, pp. 3466–3468 (1999)), $Al_2O_3$ (e.g., M. Watanabe, T. Masumoto, D. H. Ping, and K. Hono; Appl. Phys. Lett., 76, pp. 3971–3973 (2000)) and the like have been reported.

However, in case of a composite thin film consisting of ordered alloy with $L1_0$ crystal structure to which any one of the above additives is added, the crystal orientation of an ordered phase with $L1_0$ crystal structure is not controlled. Due to this, an obtained perpendicular magnetization component is small or an in-plane magnetization component is large, making it difficult to use such a composite thin film for the perpendicular magnetic recording system suited for high density recording.

That is, as for the thin film of ordered alloy with $L1_0$ crystal structure, an additive select guideline appropriate for a perpendicular magnetic recording medium, i.e., appropriate for controlling the crystal orientation of an ordered phase with $L1_0$ crystal structure and forming the ordered phase with $L1_0$ crystal structure has not been clarified so far.

Under these circumstances, demand for proposing a new composite thin film of ordered alloy with $L1_0$ crystal structure for a perpendicular magnetic recording medium is rising.

It is, therefore, an object of the present invention to provide a magnetic recording medium which is a perpendicular magnetic recording medium using a new composite thin film of ordered alloy with $L1_0$ crystal structure having high magnetocrystalline anisotropy, which can control the magnetic characteristic of an information recording layer or particularly reduce a magnetic domain size and which can ensure high density recording.

BRIEF SUMMARY OF THE INVENTION

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The present invention has been made in view of the above circumstances. To solve the above disadvantages and to attain the object, the following measures are taken according to the present invention. Namely, the inventor of the present invention discovered a novel composite thin film composition and finally completed the present invention based on this understanding.

That is, as a first embodiment of the present invention, a perpendicular magnetic recording medium, consisting of a composite thin film of a novel ordered alloy of $L1_0$ crystal structure so as to control the magnetic characteristic of an information recording layer or particularly to reduce a magnetic domain size, is proposed by a method described in claims.

[1] A magnetic recording medium having an information recording layer and capable of recording and reproducing information using a magnetic field, characterized by consisting of a composite of an ordered alloy of $L1_0$ crystal structure selected from a group A (: an FePt ordered alloy, a CoPt ordered alloy, an FePd ordered alloy and an alloy thereof), and MgO is proposed.

[2] A magnetic recording medium recited in [1], characterized in that on the information recording layer consisting of the composite, a Miller index (001) of a crystal lattice face of an ordered phase of $L1_0$ crystal structure consisting of the ordered alloy of $L1_0$ crystal structure is formed to be parallel to a surface of the information recording layer.

Further, [3] A magnetic recording medium characterized by having a layer structure having a layer consisting of a predetermined soft-magnetic material, a layer consisting of a predetermined nonmagnetic material and the above mentioned information recording layer formed sequentially in this order. In addition, [4] A magnetic recording medium recited in [3], characterized in that the nonmagnetic material is MgO. Moreover, [5] A magnetic recording medium recited in [3], characterized in that the soft-magnetic material is selected from a group B (: Fe, an Fe—Si alloy and an Ni—Fe alloy).

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIGS. 5A and 5B show the magnetic recording medium in the Example 1, where

DETAILED DESCRIPTION OF THE INVENTION

The present invention is to teach a perpendicular magnetic recording medium consisting of a novel thin film of a composite of an ordered alloy of $L1_0$ crystal structure capable of controlling the magnetic characteristic of the thin film of the ordered alloy of $L1_0$ crystal structure or particularly reducing the magnetic domain size thereof. Preferred embodiments according to the present invention will be described hereinafter and then the present invention will be concretely described based on a plurality of examples therefor with referring to FIGS. 1 to 11.

FIGS. 1A to 1D illustrate the basic layer structure of the magnetic recording medium of the present invention. It is one of the main feature of the present invention that an information recording layer 10 consists of a composite of an ordered alloy of $L1_0$ crystal structure selected from the following group A and MgO on an information recording medium for recording and reproducing information using a magnetic field. It is assumed herein that the group A includes an FePt ordered alloy, a CoPt ordered alloy, an FePd ordered alloy and an alloy thereof.

Namely, it is one of the features of the present invention to use the information recording layer of an ordered alloy of $L1_0$ crystal structure selected from the above group A and having high magnetocrystalline anisotropy so as to obtain an information recording medium excellent in thermal stability, and to add MgO to the information recording layer so as to control the magnetic characteristic of the information recording layer.

The addition quantity of MgO is not specifically restricted, so that MgO can be added in a range of, for example, a volume content (%) of 10 to a volume content (%) of 80. In this case, as the addition quantity increases, the saturation magnetization of the composite information recording layer of an ordered alloy of $L1_0$ crystal structure decreases and the signal output thereof lowers. On the other hand, a magnetic domain size is reduced, medium noise is decreased and recording resolution is improved. The addition quantity of MgO can be, therefore, appropriately set from a recording and reproducing system. The above respects are the advantages of the present invention over the conventional magnetic recording medium using an ordered alloy of $L1_0$ crystal structure to which MgO is not added.

Moreover, the MgO-added composite thin film 10 of an ordered alloy of $L1_0$ crystal structure is advantageous over, for example, an $SiO_2$-added composite thin film or an $Al_2O_3$-added composite thin film in that the thin film can be formed at lower film formation temperature. This is the advantage of the present invention over conventionally proposed additives.

Meanwhile, the thickness of the composite thin film 10 of an ordered alloy of $L1_0$ crystal structure can be determined from the viewpoint of recording and reproducing characteristics and no restriction is given to the thickness. Therefore, the thickness can be set to fall within a range of, for example, about 3 nm to 100 nm.

Figure 1A:
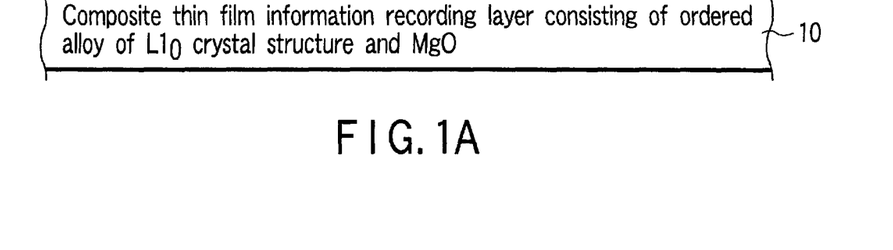
FIGS. 1A through 1D are basic layer structure views of a magnetic recording medium according to the present invention.
Figure 1B:
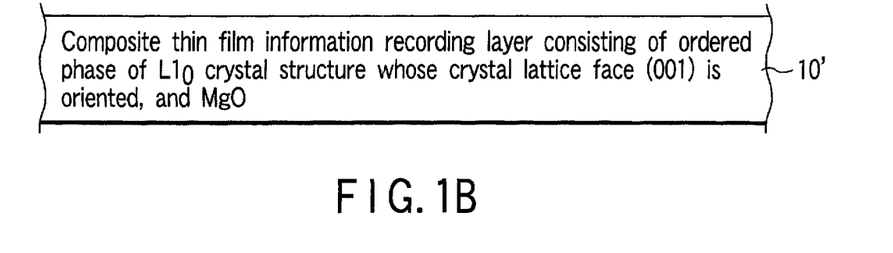

Further, the present invention is featured in that the Miller index (001) of the crystal lattice face of an ordered phase of $L1_0$ crystal structure of the information recording layer consisting of the above composite is formed to be parallel to the surface of the information recording layer as shown in FIG. 1B.

In this case, as disclosed by, for example, Japanese Patent No. 3010156, a magnetic recording medium consisting of the composite thin film 10 of an ordered alloy of $L1_0$ crystal structure can be manufactured using an underlayer 40 (see FIG. 12A) mainly consisting of an element selected from Cr, Pt, Pd, Au, Fe, Ni, MgO and Nio and a compound thereof and controlled so that the Miller index (100) of the crystal lattice face is parallel to other adjacent layers and a substrate.

Figure 1C:
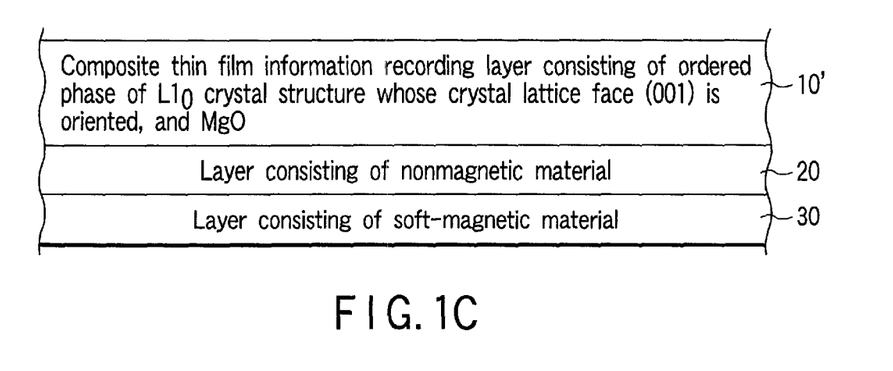

In addition, as shown in FIG. 1C, the present invention is featured in that a layer 30 made of a soft-magnetic material, a layer 20 made of a nonmagnetic material and an information recording layer 10' using the above composite thin film of an ordered alloy of $L1_0$ crystal structure are sequentially formed in this order.

Since the information recording medium according to the present invention has the layer 30 made of a soft-magnetic material, a magnetic head used for information recording can induce a perpendicular magnetic field having a narrow magnetic field distribution to the recording medium. Therefore, if the magnetization vector of the composite thin film 10' of an ordered alloy of $L1_0$ crystal structure which is an information recording layer to be used is controlled to be perpendicular to a film surface, i.e., the Miller index (001) of the crystal lattice face of an ordered phase of $L1_0$ crystal structure is controlled to be parallel to the substrate, then the steep perpendicular magnetic field can be effectively used. High density recording characteristic is thereby considerably improved which improved characteristic is particularly preferable for a high density recording medium.

Figure 1D:
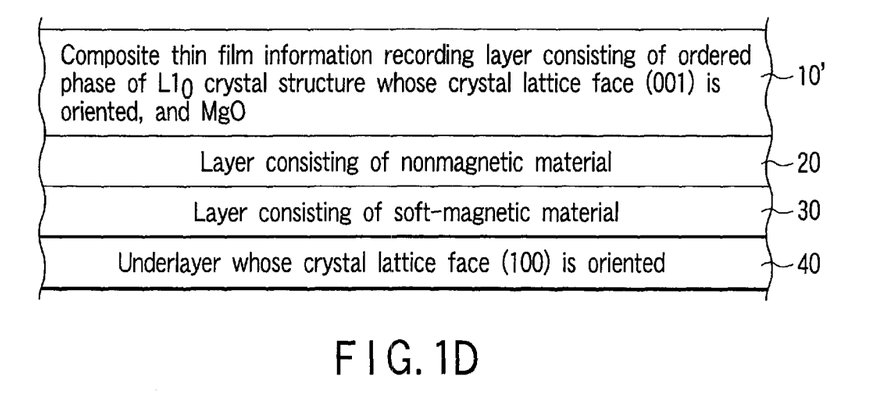

In this case, as shown in, for example, FIG. 1D, by forming an underlayer 40 mainly consisting of an element selected from Cr, Pt, Pd, Au, Fe, Ni, MgO and NiO and a compound thereof and controlled so that the Miller index (100) of a crystal lattice face is parallel to other adjacent layers and a substrate and further, sequentially forming a layer 30 consisting of a soft-magnetic material, a layer 20 consisting of a nonmagnetic material and a composite information recording layer 10' of an ordered alloy of $L1_0$ crystal structure, the Miller index (001) of the crystal lattice face of an ordered phase of $L1_0$ crystal structure of the composite information recording layer of an ordered alloy of $L1_0$ crystal structure can be controlled to be parallel to the other adjacent layers and the substrate.

The information recording medium according to the present invention has the layer 20 consisting of a nonmagnetic material and, therefore, can realize high resolution. The layer 20 consisting of a nonmagnetic material advantageously regulates the magnetic interaction between the layer 30 consisting of a soft-magnetic material and the composite thin film layer 10' of an ordered alloy of $L1_0$ crystal structure and advantageously improves the magnetic characteristic of the information recording medium, e.g., increases the coercivity of the composite information recording layer 10' of an ordered alloy of $L1_0$ crystal structure. Furthermore, depending on a nonmagnetic material to be used, the crystallinity and crystal orientation of the composite thin film 10' of an ordered alloy of $L1_0$ crystal structure can be controlled.

It is preferable that the layer 20 consisting of a nonmagnetic material does not alloy with the layer 30 consisting of a soft-magnetic material and the composite thin film layer 10' of an ordered alloy of $L1_0$ crystal structure. If MgO is used, in particular, the layer 20 can advantageously, greatly improve resolution. Further, if MgO is used, the crystallinity and crystal orientation of an ordered phase of $L1_0$ crystal structure for the composite thin film layer 10' of an ordered alloy of $L1_0$ crystal structure can be improved and the film thickness of the information recording layer 10 can be decreased. Accordingly, it is possible to narrow the magnetic distribution of the magnetic head used in information recording, to intensify the strength of the magnetic head and to, therefore, expect an advantage of improving recording characteristic.

The thickness of the layer 20 consisting of a nonmagnetic material can be appropriately set according to the combination of the layer 30 consisting of a soft-magnetic material and the composite thin film layer 10' of an ordered alloy of $L1_0$ crystal structure used herein. However, preferably, the thickness does not adversely influence at least a recording magnetic field generated by the magnetic head used for information recording, e.g., the thickness is about 10 nm or less.

It is noted that "nonmagnetic material" used in the present invention refers to a material having diamagnetism, paramagnetism and antiferromagnetism at room temperature.

The layer 30 consisting of a soft-magnetic material according to the present invention can be appropriately selected from an alloy, an oxide, a multilayer film and a granular film according to the saturation magnetization of the composite thin film layer 10' of an ordered alloy of $L1_0$ crystal structure to be used, the magnetic head used in information recording or the recording and reproducing system. For example, if Fe or an Fe-based alloy, to be specific, an Fe—Si alloy (with an Si composition of, for example, 1. 5 wt %) or an Ni—Fe alloy (with a weight composition ratio of, for example, Ni/Fe=1) having high saturation magnetization is used, the soft-magnetic material can be formed into a thin film. If an Ni—Fe alloy (with a weight composition ratio of, for example, Ni/Fe=4) having high magnetic permeability is used, high recording sensitivity can be obtained. From this, Fe, an Fe—Si alloy and an Ni—Fe alloy are particularly preferable.

Further, a granular film consisting of one of these alloys and, for example, an oxide has high electrical resistivity and can reduce eddy current loss generated during high frequency recording. The granular film is, therefore, applicable for high frequency recording. On the other hand, if an amorphous alloy, e.g., a Co—Zr—Nb alloy is used, the surface smoothness of the recording medium can be improved and damage to the magnetic head used for recording and reproducing information can be reduced. Therefore, the amorphous alloy is preferable, as well.

The thickness of the layer 30 consisting of a soft-magnetic material can be set in light of the geometrical shape of the magnetic head to be used. To be specific, if a single-pole type writing head is used, the layer 30 can be set to have a thickness of about 50 nm to 1 $\mu$m. If a ring type writing head is used, the layer 30 can be set to have a thickness of about 5 nm to 50 nm.

Further, the information recording medium according to the present invention can be manufactured using a "sputter-deposition method". Namely, by sequentially forming the soft-magnetic layer 30, the nonmagnetic layer 20 and the information recording layer 10 or 10' consisting of a composite of an ordered alloy of $L1_0$ crystal structure selected from the group A and MgO, the layer structure of the information recording medium is formed. It is noted that the group A includes an FePt ordered alloy, a CoPt ordered alloy, an FePd ordered alloy and an alloy thereof.

The soft-magnetic layer 30 can be also manufactured by not only the sputter-deposition method but also by, for example, an electrochemical method. It is also possible that a substrate made of a soft-magnetic material, e.g., a ferrite substrate functions as the layer 30. While the types of applicable substrates are not specifically restricted, such substrates as a glass substrate, an Si substrate, a sapphire substrate and a ceramic substrate are available.

In the meantime, evaluation standards for evaluating the magnetic recording medium according to the present invention are based on the following evaluation methods:
(1) To evaluate crystal structure, X-ray diffraction using a Cu-K$\alpha$ ray is used. In this case, to evaluate crystal orientation, a rocking curve relative to an evaluation target crystal lattice face is measured and a half value width of the rocking curve is set as an index.
(2) To evaluate magnetic characteristic, a hysteresis loop is measured using a polar Kerr-effect and perpendicular coercivity is obtained. Also, the squareness of the loop is a ratio ($\theta r/\theta m$) of a Kerr rotation angle ($\theta r$) in a remanence state to a Kerr rotation angle ($\theta m$) in a maximum applied magnetic field (13 kOe).
(3) To evaluate a magnetic domain size, a sample is subjected to ac demagnetization, the magnetic image of the sample is observed using a magnetic force microscope and a magnetic domain size is evaluated from spectrum analysis thereof.
(4) Recording and reproducing characteristic is evaluated at a linear velocity of 5.08 m/s. A thin film single-pole type head having a main pole thickness of 1 $\mu$m and a track width of 10 $\mu$m is used as a writing head and a magneto-resistive head having a shield gap length of 0.13 $\mu$m and a track width of 0.63 $\mu$m is used as a reproducing head.

Next, several detailed examples to which the present invention is applied will be cited and the functions and advantages of the present invention will be described while sequentially comparing the examples with what have been obtained by the above evaluation methods according to the conventional technique.

EXAMPLE 1

FIGS. 2A, 2B and 3A and 3B illustrate the layer structure of a magnetic recording medium in the Example 1 according to the present invention and the layer structures of magnetic recording media in Comparative examples.

Figure 2A:
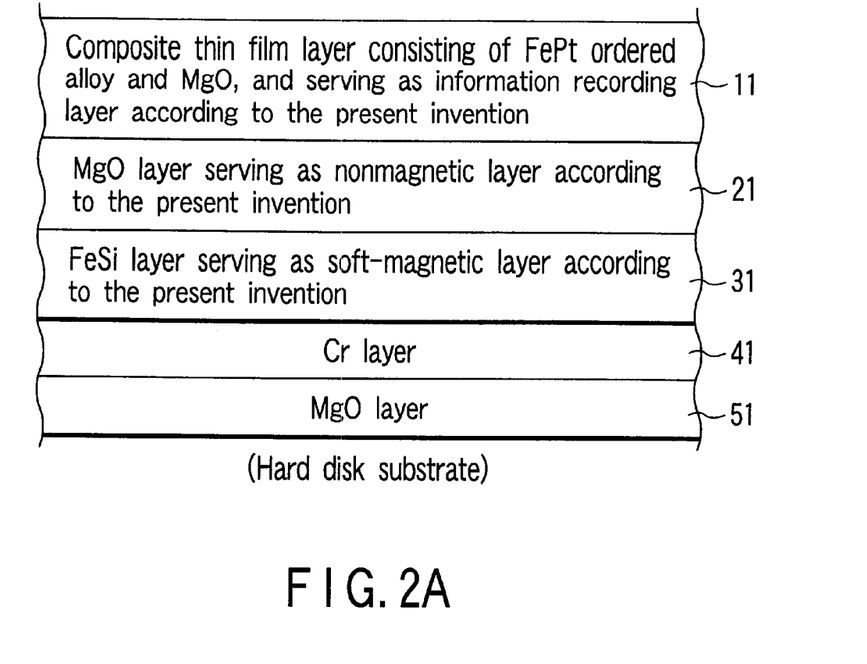
FIG. 2A is a layer structure view of a magnetic recording medium in Example 1.

The magnetic recording medium in the Example 1 according to the present invention has a layer structure shown in FIG. 2A and manufactured as follows. An MgO layer having a thickness of 5 nm, a Cr layer having a thickness of 70 nm, an FeSi layer having a thickness of 200 nm as a soft-magnetic layer according to the present invention, an MgO layer having a thickness of 1 nm as a nonmagnetic layer according to the present invention, and an information recording layer consisting of a composite of an FePt ordered alloy according to the present invention and MgO (which will be referred to as "FePt-MgO composite thin film" hereinafter) and having a thickness of 12 nm were sequentially formed on a hard disk substrate in this order by the "rf-magnetron sputter deposition method", "dc-magnetron sputter deposition method", "dc-magnetron sputter deposition method" and "rf-magnetron sputter deposition method", respectively. At this time, the FePt-MgO composite thin film layer was formed by arranging MgO chips on the FePt alloy (with an atom composition ratio of Fe/Pt=1) sputter target and using the "rf sputter deposition method". Sputter deposition film formation conditions for the FePt-MgO composite thin film were a substrate temperature of 450° C., sputter gas pressure of 50 Pa, and a target-substrate distance of 95 mm. It is noted that the sputter deposition film formation conditions of all other layers were a substrate temperature of 50° C., sputter gas pressure of 0.2 Pa and a target-substrate distance of 50 mm.

(Operational Advantage 1)

Figure 4A:
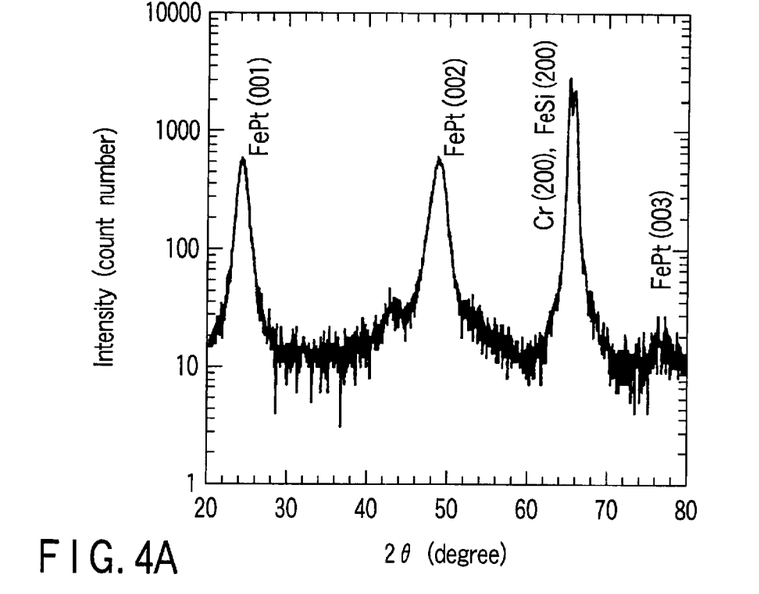
FIG. 4A is a graph showing an X-ray diffraction pattern of the magnetic recording medium in the Example 1.

FIG. 4A shows the X-ray diffraction pattern of the recording medium manufactured by the above method. As shown therein, the recording medium has a diffraction pattern indicating that the formation and crystal orientation of an FePt ordered phase is the Miller index (001) of a crystal lattice face. The half value width of a rocking curve relative to the Miller index (001) of the crystal lattice face of this FePt ordered phase is 4.8 degrees, obviously indicating excellent crystal orientation.

Figure 4B:
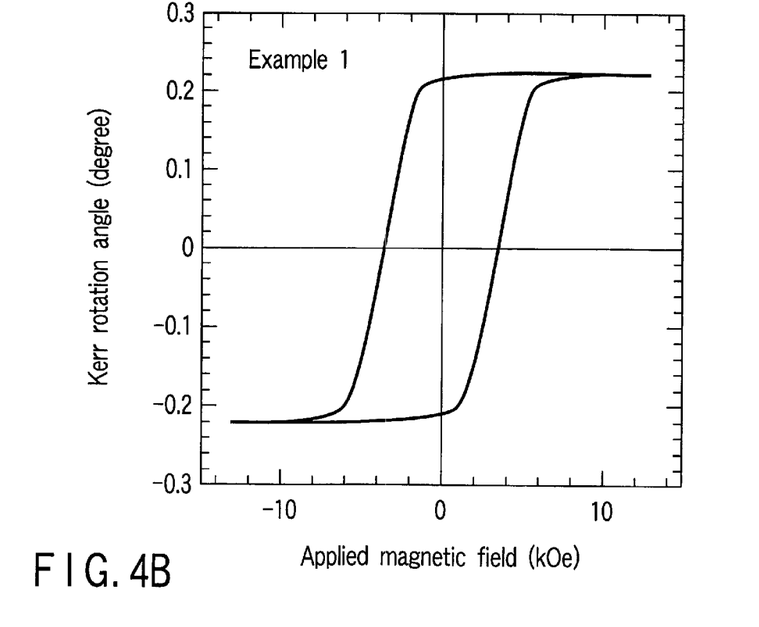
FIG. 4B shows a hysteresis loop showing the magnetic characteristic of the magnetic recording medium in the Example 1.

Further, FIG. 4B shows the hysteresis loop of the above recording medium. Perpendicular coercivity is 3.4 kOe and squareness is 0.96, thus exhibiting excellent magnetic characteristic as a perpendicular magnetic recording medium.

Figure 5A:
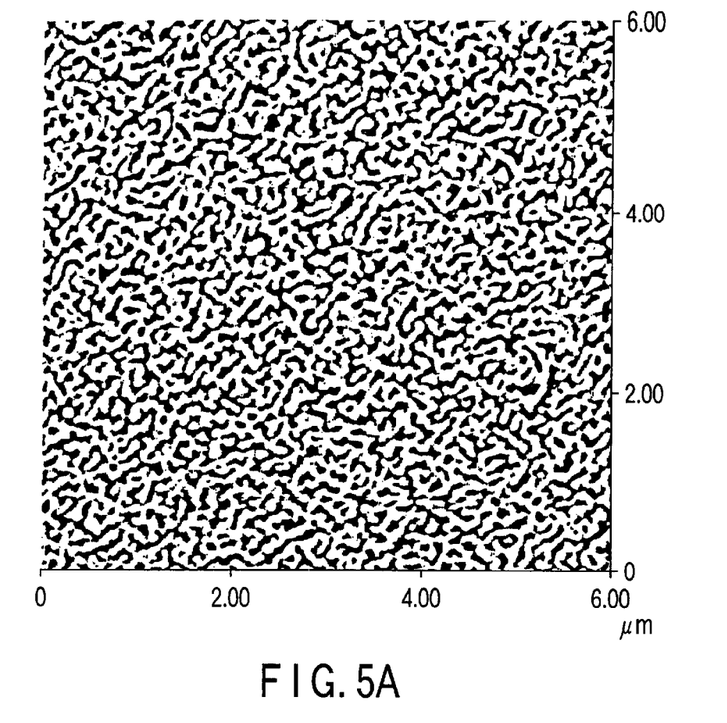
FIG. 5A is an enlarged view of a magnetic image of the magnetic recording medium in the Example 1 observed by a magnetic force microscope.

Furthermore, FIG. 5A shows the result of observing the magnetic domain structure of the above recording medium using a magnetic force microscope. A magnetic domain size obtained from the spectrum analysis of this magnetic force microscope is 78 nm, obviously indicating that the magnetic domain size of the recording medium is smaller than that of the information recording medium in the Comparative example 1 according to the conventional technique as will be described later.

Figure 5B:
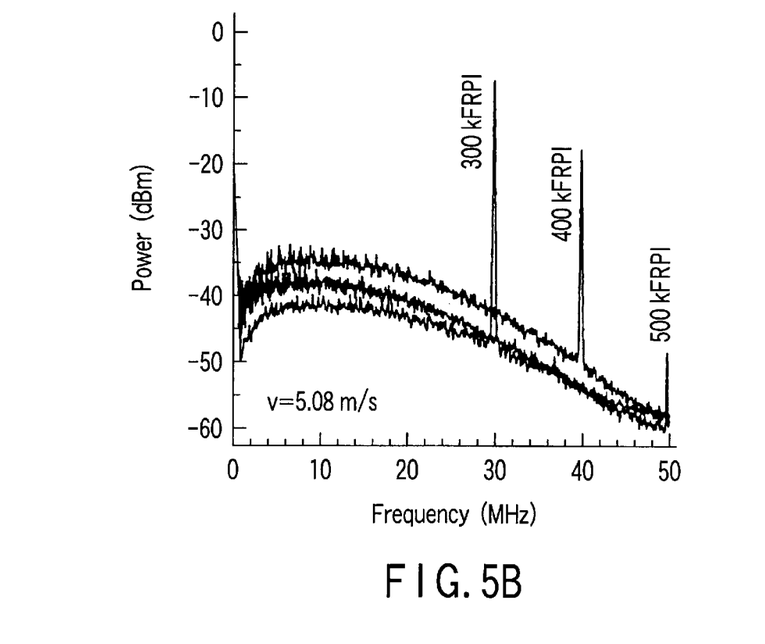
FIG. 5B shows signal output spectrums indicating the recording and reproducing evaluation result of the magnetic recording medium in the Example 1.

FIG. 5B shows the evaluation result of the recording and reproducing characteristic of the above recording medium. FIG. 5B illustrates the spectrum of a reproduction signal at the time of recording a signal having a linear recording density of 300 kFRPI, the spectrum of a reproduction signal at the time of recording a signal having a linear recording density of 400 kFRPI and the spectrum of a reproduction signal at the time of recording a signal having a linear recording density of 500 kFRPI. Obviously, therefore, a signal having a linear recording density of 500 kFRPI can be recorded and reproduced. That is, it is indicated that the recording medium of the present invention has high resolution.

COMPARATIVE EXAMPLE 1

Figure 2B:
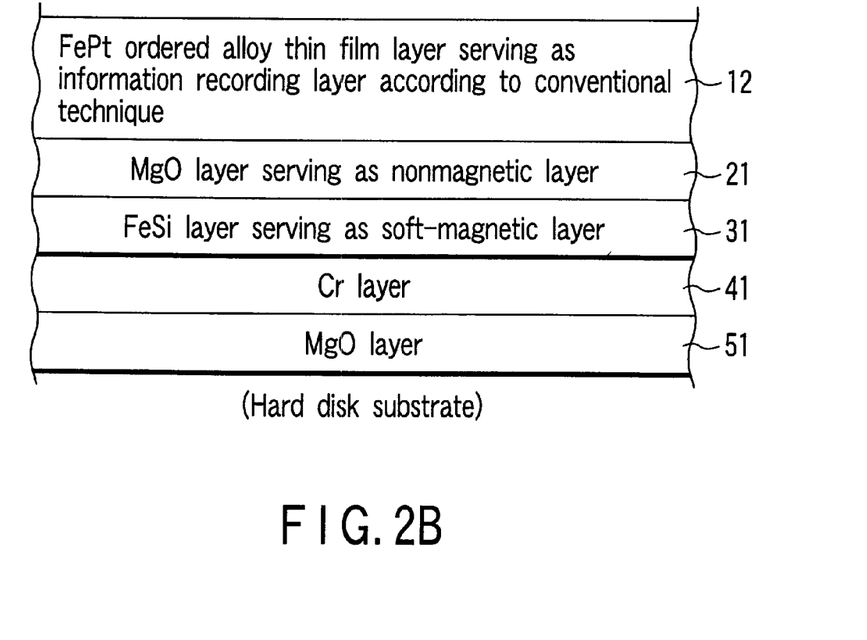
FIG. 2B is a layer structure view of a magnetic recording medium in Comparative example 1 for the Example 1.

As one Comparative example for the information recording medium according to the present invention, a recording medium was manufactured by the same method except that an information recording layer 11 constituting the magnetic recording medium described in the Example 1 was replaced by an FePt thin film 12 according to the conventional technique (see FIG. 2B).

Figure 6:
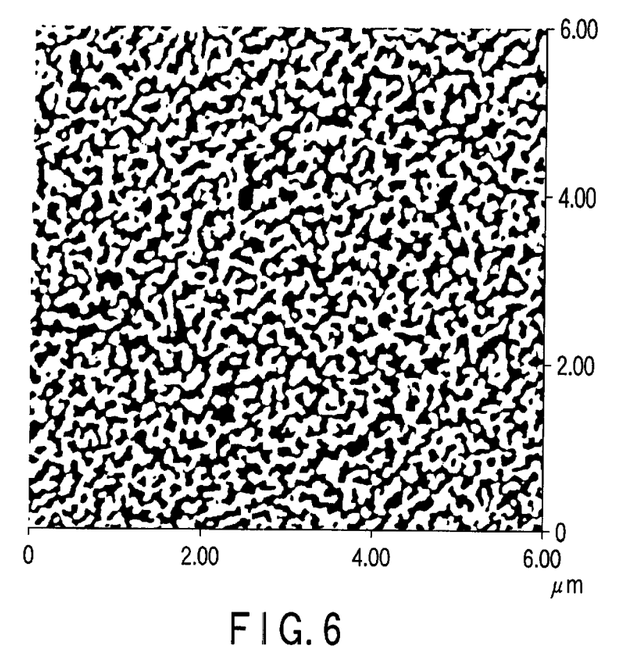
FIG. 6 is an enlarged view of a magnetic image of a magnetic recording medium in the Comparative example 1 for the Example 1 observed by the magnetic force microscope.

FIG. 6 shows the result of observing the magnetic domain structure of this medium using the magnetic force microscope. A magnetic domain size obtained from the spectrum analysis of this magnetic force microscope is 95 nm, obviously indicating that the magnetic domain size thus obtained is larger than that of the information recording medium in the Example 1 due to the fact that the microstructure of the thin film is not controlled.

COMPARATIVE EXAMPLE 2

Figure 3A:
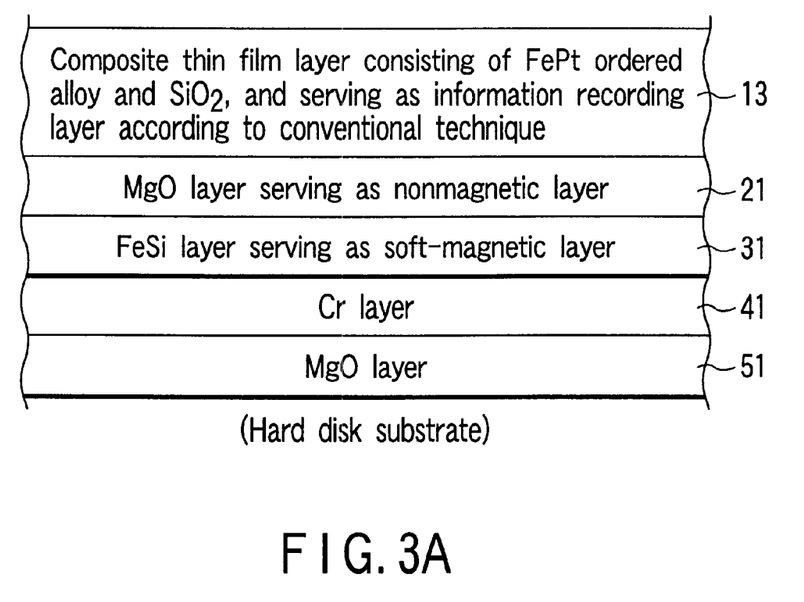
FIG. 3A is a layer structure view of a magnetic recording medium in Comparative example 2 for the Example 1.

As another Comparative example for the information recording medium according to the present invention, an information recording medium was manufactured by the same method except that the information recording layer 11 constituting the magnetic recording medium described in the Example 1 was replaced by an FePt—$SiO_2$ composite thin film layer 13 (see FIG. 3A).

It is noted that this FePt—$SiO_2$ composite thin film layer was formed by arranging $SiO_2$ chips on an FePt alloy (with an atom composition ratio of Fe/Pt=1) sputter target and using the "rf sputter deposition method". Sputter deposition film formation conditions for the FePt—$SiO_2$ composite thin film were a substrate temperature of 450° C., sputter gas pressure of 50 Pa and a target-substrate distance of 95 mm.

Figure 7:
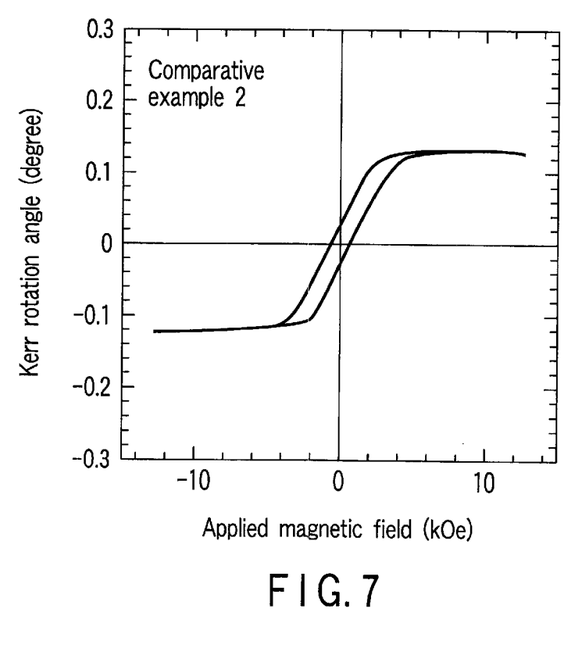
FIG. 7 shows a hysteresis loop showing the magnetic characteristic of a magnetic recording medium in the Comparative example 2 for the Example 1.

FIG. 7 shows the hysteresis loop of the recording medium in the Comparative example 2. Perpendicular coercivity is 0.8 kOe and squareness is 0.23. It is obvious that these characteristics make it difficult to use the recording medium in the Comparative example 2 as a magnetic recording medium.

COMPARATIVE EXAMPLE 3

Figure 3B:
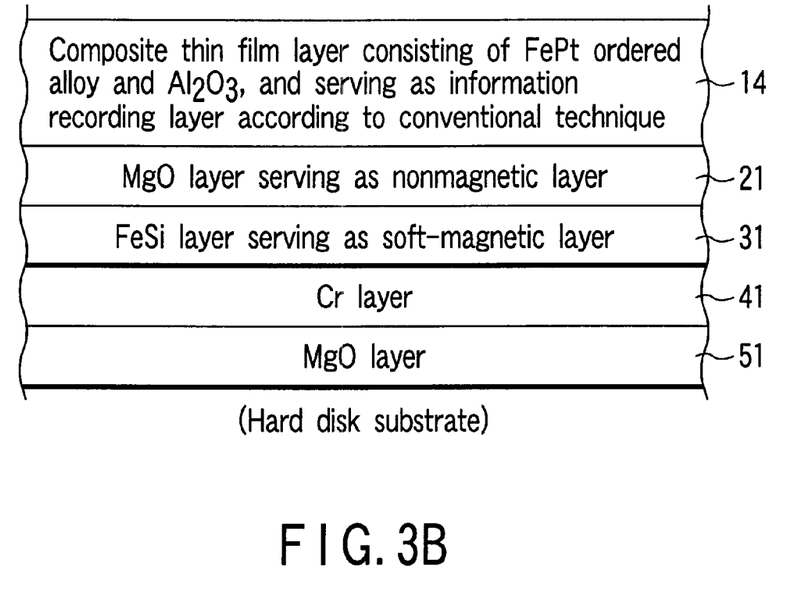
FIG. 3B is a layer structure view of a magnetic recording medium in Comparative example 3 for the Example 1.

As yet another Comparative example for the information recording medium according to the present invention, a recording medium was manufactured by the same method except that the information recording layer 11 constituting the magnetic recording medium described in the Example 1 was replaced by an FePt—$Al_2O_3$ composite thin film layer 14 (see FIG. 3B). It is noted that this FePt—$Al_2O_3$ composite thin film layer was formed by arranging $Al_2O_3$ chips on an FePt alloy (with atom composition ratio of Fe/Pt=1) sputter target and using the "rf sputter deposition method". Sputter deposition film formation conditions for the FePt—$Al_2O_3$ composite thin film were a substrate temperature of 450° C., sputter gas pressure of 50 Pa and a target-substrate distance of 95 mm.

Figure 8:
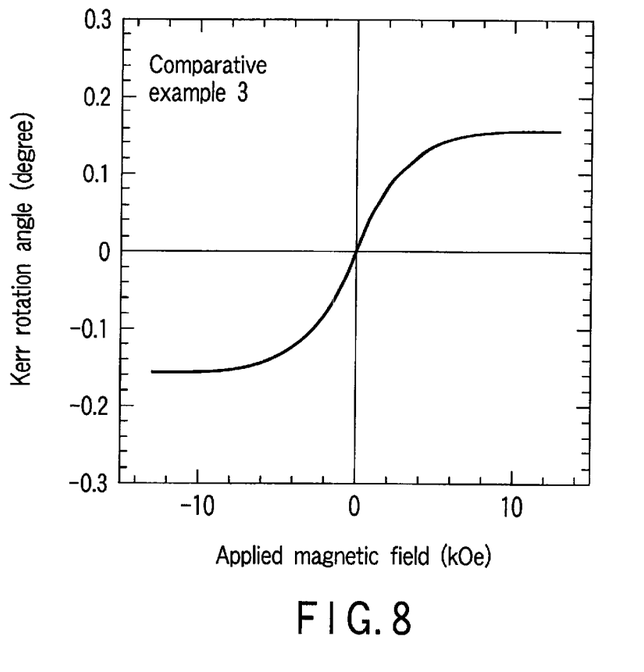
FIG. 8 shows a hysteresis loop showing the magnetic characteristic of a magnetic recording medium in Comparative example 3 for the Example 1.

FIG. 8 shows the hysteresis loop of the recording medium in the Comparative example 3. This indicates that perpendicular coercivity is 0.1 kOe and squareness is 0.02, which characteristics make it difficult to use the recording medium in the Comparative example 3 as a magnetic recording medium.

EXAMPLE 2

In the Example 2 according to the present invention, magnetic recording media were manufactures by forming a soft-magnetic layer 31 (see FIG. 2A) constituting the magnetic recording medium described in the above Example 1 to have a thickness of 500 nm and changing substrate temperature at the time of forming the information recording layer 11 according to the present invention to, for example, 300° C., 350° C., 400° C., 450° C. and 500° C.

(Operational Advantage 2)

Figure 9:
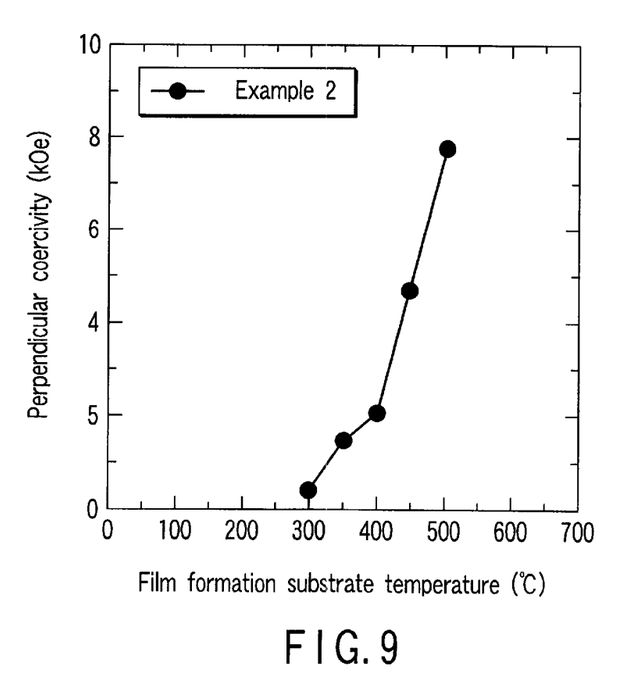
FIG. 9 is a graph showing the relationship between substrate temperature during film formation and the perpendicular coercivity of a magnetic recording medium manufactured in the Example 2.

FIG. 9 shows the result of the evaluation of perpendicular coercivity relative to the FePt—MgO composite thin film layers of the respective media formed in this Example 2.

As shown in FIG. 9, sufficiently high perpendicular coercivity could be obtained at low substrate temperature compared with perpendicular coercivity relative to an FePt—$SiO_2$ composite thin film layer in the Comparative example 4 to be described later or that relative to an FePt—$Al_2O_3$ composite thin film layer in the Comparative example 5 to be described later. That is, it is indicated that an MgO-added composite of an ordered alloy of $L1_0$ crystal structure has an excellent composite constitution suited for the perpendicular magnetic recording medium.

COMPARATIVE EXAMPLE 4

Magnetic recording media were manufactured by forming a soft-magnetic layer 31 constituting the information recording medium described in the Comparative example 2 to have a thickness of 500 nm and changing substrate temperature at the time of forming an FePt—$SiO_2$ composite thin film layer 13 serving as an information recording layer (see FIG. 3A) to 400° C., 450° C., 500° C., 550° C. and 600° C.

Figure 10:
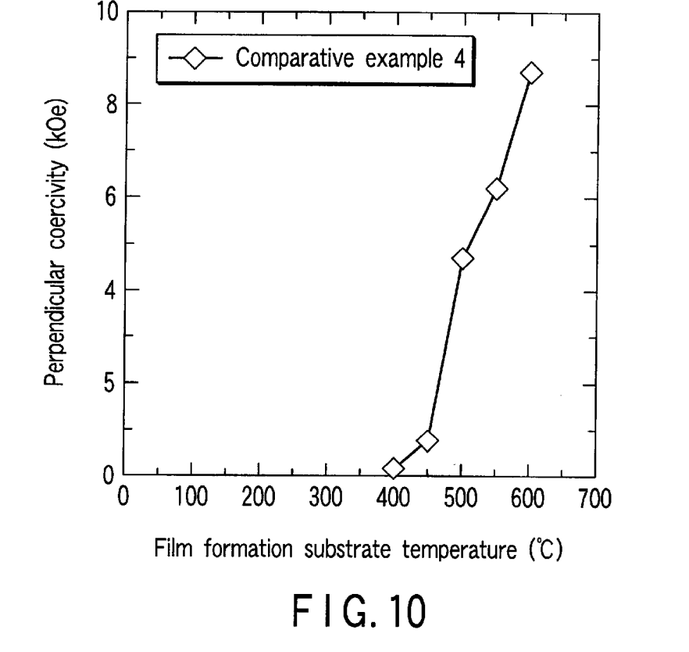
FIG. 10 is a graph showing the relationship between substrate temperature during film formation and perpendicular coercivity in Comparative example 4 for the Example 2.

FIG. 10 shows the evaluation result of perpendicular coercivity relative to the FePt—$SiO_2$ composite thin film layers of the respective recording media manufactured in this Comparative example 4.

FIG. 10 indicates that high substrate temperature is necessary to attain perpendicular coercivity appropriate for a magnetic recording medium compared with the Example 2. Accordingly, if high temperature and relevant cost problems are permitted, it is possible to employ such composite thin films.

COMPARATIVE EXAMPLE 5

Magnetic recording media were manufactured by forming a soft-magnetic layer 31 constituting the information recording medium described in the above Comparative example 3 to have a thickness of 500 nm and changing substrate temperature at the time of forming an FePt—$Al_2O_3$ composite thin film layer 14 (see FIG. 3B) serving as an information recording layer constituting the information recording medium to, for example, 350° C., 400° C., 450° C., 500° C., 550° C. and 600° C.

Figure 11:
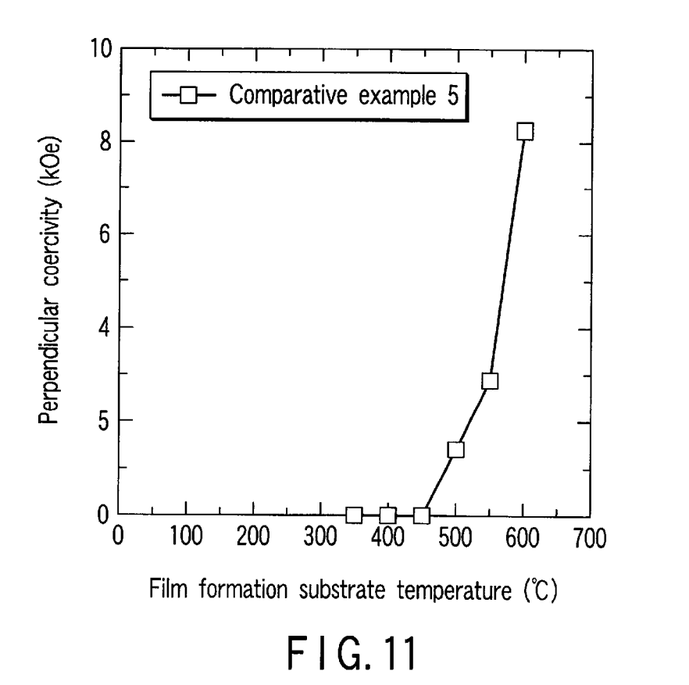
FIG. 11 is a graph showing the relationship between substrate temperature during film formation and perpendicular coercivity in Comparative example 5 for the Example 2.

FIG. 11 shows the evaluation result of perpendicular coercivity relative to the FePt—Al$_2$O$_3$ composite thin film layers of the respective media manufactured in the Comparative example 5.

FIG. 11 indicates that high substrate temperature is necessary to attain perpendicular coercivity appropriate for a magnetic recording medium compared with the Example 2. Accordingly, if high temperature and relevant cost problem are permitted, it is possible to employ such composite thin films.

MODIFIED EXAMPLE

The present invention has been described so far with reference to a plurality of embodiments and concrete examples. It is noted that the present invention is not limited to these examples and various changes and modifications can be made within the spirit and the scope of the present invention.

(Advantage of the Invention)

As stated so far, if the perpendicular magnetic recording medium proposed by the present invention is employed, it is possible to control magnetic characteristics or, in particular, to reduce a magnetic domain size and to attain high recording resolution. In addition, the recording medium constituted out of the composite thin film of an ordered alloy of $L1_0$ crystal structure according to the present invention can exhibit excellent magnetic characteristic at low film formation temperature compared with the recording medium constituted out of the composite thin film of an ordered alloy of $L1_0$ crystal structure according to the conventional technique.

Moreover, since the composite thin film of an ordered alloy of $L1_0$ crystal structure having high magnetocrystalline anisotropy is employed for the perpendicular magnetic recording medium according to the present invention, the perpendicular magnetic recording medium has an excellent advantage of thermal stability. Accordingly, it is possible to provide a high density information recording medium for higher density information recording desired in the future, particularly a magnetic recording medium ensuring high recording resolution for magnetic recording.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended clams and their equivalents.

What is claimed is:

1. A magnetic recording medium comprising:

an information recording layer, the magnetic recording medium capable of recording and reproducing information using a magnetic field, wherein said information recording layer consists of a composite of an ordered alloy of $L1_0$ crystal structure selected from group A, and MgO, the group A consists of: an FePt ordered alloy, a CoPt ordered alloy, an FePd ordered alloy and an alloy thereof.

2. A magnetic recording medium according to claim 1, wherein on said information recording layer consisting of said composite, a Miller index (001) of a crystal lattice face of an ordered phase of $L1_0$ crystal structure consisting of said ordered alloy of $L1_0$ crystal structure is formed to be parallel to a surface of said information recording layer.

3. A magnetic recording medium according to claim 2, wherein said magnetic recording medium has a layer structure having a layer consisting of a predetermined soft-magnetic material, a layer consisting of a predetermined nonmagnetic material and said information recording layer formed sequentially in this order.

4. A magnetic recording medium according to claim 3, wherein said nonmagnetic material is MgO.

5. A magnetic recording medium according to claim 3, wherein said soft-magnetic material is selected from group B, the group B consists of: Fe, an Fe-Si alloy and an Ni-Fe alloy.

* * * * *